United States Patent
Trivedi et al.

(10) Patent No.: US 10,989,058 B2
(45) Date of Patent: Apr. 27, 2021

(54) SEGMENTED PISTON SEAL SYSTEM

(71) Applicant: General Electric Company, Schenectady, NY (US)

(72) Inventors: Deepak Trivedi, Niskayuna, NY (US); Rahul Anil Bidkar, Niskayuna, NY (US); Xiaoqing Zheng, Schenectady, NY (US); Christopher Edward Wolfe, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 163 days.

(21) Appl. No.: 15/957,415

(22) Filed: Apr. 19, 2018

(65) Prior Publication Data
US 2019/0323370 A1 Oct. 24, 2019

(51) Int. Cl.
*F01D 11/00* (2006.01)
*F01D 5/02* (2006.01)
*F01D 25/18* (2006.01)
*F16J 15/34* (2006.01)

(52) U.S. Cl.
CPC .............. *F01D 11/003* (2013.01); *F01D 5/02* (2013.01); *F01D 25/183* (2013.01); *F16J 15/3488* (2013.01); *F05D 2220/32* (2013.01); *F05D 2230/60* (2013.01); *F05D 2240/55* (2013.01)

(58) Field of Classification Search
CPC . F16J 15/3488; F05D 2240/55; F01D 11/003; F01D 5/02; F01D 25/183
See application file for complete search history.

(56) References Cited

U.S. PATENT DOCUMENTS

| | | | |
|---|---|---|---|
| 1,271,077 A * | 7/1918 | Probasco | F16J 9/14 277/499 |
| 2,398,270 A | 4/1946 | Zahodiakin | |
| 2,996,319 A * | 8/1961 | Copes | F16J 15/38 277/370 |
| 3,575,424 A | 4/1971 | Taschenberg | |
| 4,050,702 A | 9/1977 | Del Matto | |

(Continued)

FOREIGN PATENT DOCUMENTS

| CN | 201599401 U | 10/2010 |
|---|---|---|
| CN | 103244676 A | 8/2013 |

(Continued)

OTHER PUBLICATIONS

Fei et al., "Numerical investigation on the leakage characteristics of stepped labyrinth seal", 2016 IEEE International Conference on Aircraft Utility Systems (AUS), China, pp. 676-681, Oct. 2016.

(Continued)

*Primary Examiner* — Eugene G Byrd
(74) *Attorney, Agent, or Firm* — Mary D. Lawlor; The Small Patent Law Group LLC

(57) ABSTRACT

The subject matter described herein relate to a segmented piston seal system. The segmented piston seal includes a first semi-circular section (FSCS) that includes a first locking structure at opposite ends of the FSCS. The segmented piston seal includes a second semi-circular section (SSCS) that includes a second locking structure at opposite ends of the SSCS. The first and second locking structures are configured to lock the FSCS and the SSCS together to form a piston seal.

14 Claims, 13 Drawing Sheets

(56) References Cited

U.S. PATENT DOCUMENTS

| | | | | |
|---|---|---|---|---|
| 4,215,870 | A | * | 8/1980 | Escue .................. F16J 15/3488 277/379 |
| 4,410,188 | A | * | 10/1983 | Copes .................. F16J 15/3488 277/353 |
| 4,533,149 | A | * | 8/1985 | Vater .......................... F16J 9/28 277/469 |
| 4,580,793 | A | * | 4/1986 | Bronson ............. F16J 15/3488 277/547 |
| 4,840,379 | A | | 6/1989 | Thoman, Jr. |
| 4,844,487 | A | * | 7/1989 | Eakin ........................ F16J 9/14 277/497 |
| 5,370,401 | A | * | 12/1994 | Sandgren ............. F16J 15/3488 277/306 |
| 5,395,124 | A | | 3/1995 | Brandon |
| 5,509,664 | A | | 4/1996 | Borkiewicz |
| 5,513,857 | A | * | 5/1996 | Watanabe .............. F02G 1/0535 277/469 |
| 5,547,203 | A | | 8/1996 | Binford |
| 5,615,893 | A | * | 4/1997 | Reagan ................ F16J 15/3488 277/370 |
| 5,913,521 | A | * | 6/1999 | Sangren ............... F16J 15/3488 277/370 |
| 5,967,525 | A | | 10/1999 | Sandgren et al. |
| 6,076,832 | A | * | 6/2000 | Pow ..................... F16J 15/3488 277/546 |
| 6,572,114 | B1 | | 6/2003 | Magoshi et al. |
| 7,165,772 | B1 | * | 1/2007 | Camacho ............... B64D 13/02 277/496 |
| 8,177,237 | B2 | * | 5/2012 | Lindner-Silwester ..... F16J 9/14 277/435 |
| 8,454,024 | B2 | * | 6/2013 | Kakehi .................. F16J 15/441 277/496 |
| 9,017,015 | B2 | * | 4/2015 | Casavant ................ F01D 25/26 415/134 |
| 9,854,879 | B2 | * | 1/2018 | Barr ....................... A44B 15/00 |
| 10,060,531 | B2 | * | 8/2018 | Mayer ................. F16J 15/3272 |
| 2008/0272552 | A1 | | 11/2008 | Zheng et al. |
| 2008/0296847 | A1 | * | 12/2008 | Chevrette ............ F01D 11/003 277/422 |
| 2009/0051126 | A1 | * | 2/2009 | King, Jr. ................ F16L 13/103 277/631 |
| 2010/0164183 | A1 | | 7/2010 | Berard et al. |
| 2016/0327161 | A1 | | 11/2016 | Sato |
| 2018/0003067 | A1 | | 1/2018 | Bidkar et al. |

FOREIGN PATENT DOCUMENTS

| | | | | |
|---|---|---|---|---|
| EP | 1243755 | A1 | | 9/2002 |
| EP | 2857639 | A1 | | 4/2015 |
| JP | 07071617 | A | * | 3/1995 ............... F16J 15/54 |
| JP | 07198043 | A | * | 8/1995 ........... F16J 15/3488 |

OTHER PUBLICATIONS

International Search Report for PCT Serial No. PCT/US2019/013125 dated Apr. 30, 2019, 3 pages.

Written Opinion for PCT Serial No. PCT/US2019/013125 dated Apr. 30, 2019, 9 pages.

* cited by examiner

SEGMENTED PISTON SEAL SYSTEM

STATEMENT REGARDING FEDERALLY SPONSORED RESEARCH OR DEVELOPMENT

This invention was made with Government support under contract number DE-FE0024007. The Government has certain rights in this invention.

FIELD

The subject matter described herein relate to a seal for a piston.

BACKGROUND

Conventional piston seals are single body or single piece seals. For example, conventional piston seals are a single uniform ring. Conventional piston seals may not be able to be installed on large diameter segmented machines where axial access is not available. For example, the conventional piston seals may not be able to be installed on horizontally split turbomachinery with large rotor diameters.

BRIEF DESCRIPTION

In one embodiment, a segmented piston seal is provided. The segmented piston seal includes a first semi-circular section (FSCS) that includes a first locking structure at opposite ends of the FSCS. The segmented piston seal includes a second semi-circular section (SSCS) that includes a second locking structure at opposite ends of the SSCS. The first and second locking structures are configured to lock the FSCS and the SSCS together to form a piston seal. The segmented piston seal includes the FSCS and the SSCS are configured to reduce the pre-load of the piston seal on a rotor. The first and second locking structures preserve an internal moment continuity across a circumference of the piston seal.

In one embodiment, a method of forming a segmented piston seal is provided. The method includes forming a first semi-circular section (FSCS). The method includes constructing a first locking structure at opposite ends of the FSCS. The method includes forming a second semi-circular section (SSCS). The method includes constructing a second locking structure at opposite ends of the SS CS. The first and second locking structures are configured to lock the FSCS and the SSCS together to form a piston seal. The FSCS and the SSCS reduces the pre-load of the piston seal on a rotor.

In one embodiment, a segmented piston seal is provided. The segmented piston seal includes a first semi-circular section (FSCS) that includes a first locking structure at opposite ends of the FSCS. The segmented piston seal includes a second semi-circular section (SSCS) that includes a second locking structure at opposite ends of the SSCS. The first and second locking structures are configured to lock the FSCS in the SSCS together to form a piston seal. The FSCS in the SSCS are configured to be installed horizontally on a rotor of a split turbomachinery. The FSCS and the SSCS are configured to reduce the pre-load of the piston seal on a rotor. The first and second locking structures preserve an internal moment continuity across a circumference of the piston seal.

The first and second locking structures comprise different first and second locking structures. The first and second locking structures may include the orthogonal arms that are configured to be positioned within orthogonal receptacles. A plurality of rods are configured to be positioned within a series of receptacle holes that are configured to receive the plurality of rods. The first and second locking structures may include a plurality of rods having spheres with expanded diameters. The first and second locking structures may include a plurality of rods are configured to be received by corresponding holes. The holes having an expanded diameter to receive the plurality of rods. The plurality rods having expanded diameters. The plurality of rods are configured to be received by the corresponding holes. The holes having an expanded diameter to receive the plurality of rods. The first and second locking structures may include a rod having expanded diameters. The rod is configured to be received by corresponding holes. The holes having an expanded diameter to receive the rod. First and second orthogonal cut-outs. The first and second orthogonal cut-outs are configured to be received by each other.

BRIEF DESCRIPTION OF THE DRAWINGS

The inventive subject matter will be better understood from reading the following description of non-limiting embodiments, with reference to the attached drawings, wherein below.

DETAILED DESCRIPTION

Conventional piston rings enable for developing tight face seals that may provide an order of magnitude reduction in gas path leakage. However, the conventional piston rings may not be able to be installed on horizontally split turbomachinery with large rotor diameters. Further, the conventional piston rings are used at both high and low pressure and temperature.

One or more embodiments of the subject matter described herein remedies the above issues of the conventional piston rings. One or more embodiments described herein segment the piston ring into first and second semi-circular sections. At opposite ends of the first and second semi-circular sections are first and second locking structures. The first and second locking structures are configured to lock the first and second semi-circular sections together to form a piston seal.

The segmented piston seal may be split into two pieces and reassembled during installation into the combined cycle system and/or motor. The segmented piston seal may be made and assembled as a single seal that has the required pre-load and minimal segment leakage. For example, the first and second locking structures may be used to form a piston seal.

The first and second semi-circular sections may be installed on horizontally split machines. The first and second locking structures between the two halves are configured to provide a boundary condition that allows continuity of the piston seal loading from one half of the seal to the other. The forming of the piston seal enables the seal to exert the pre-load necessary for sealing when the seal is not pressure energized.

Figure 1:
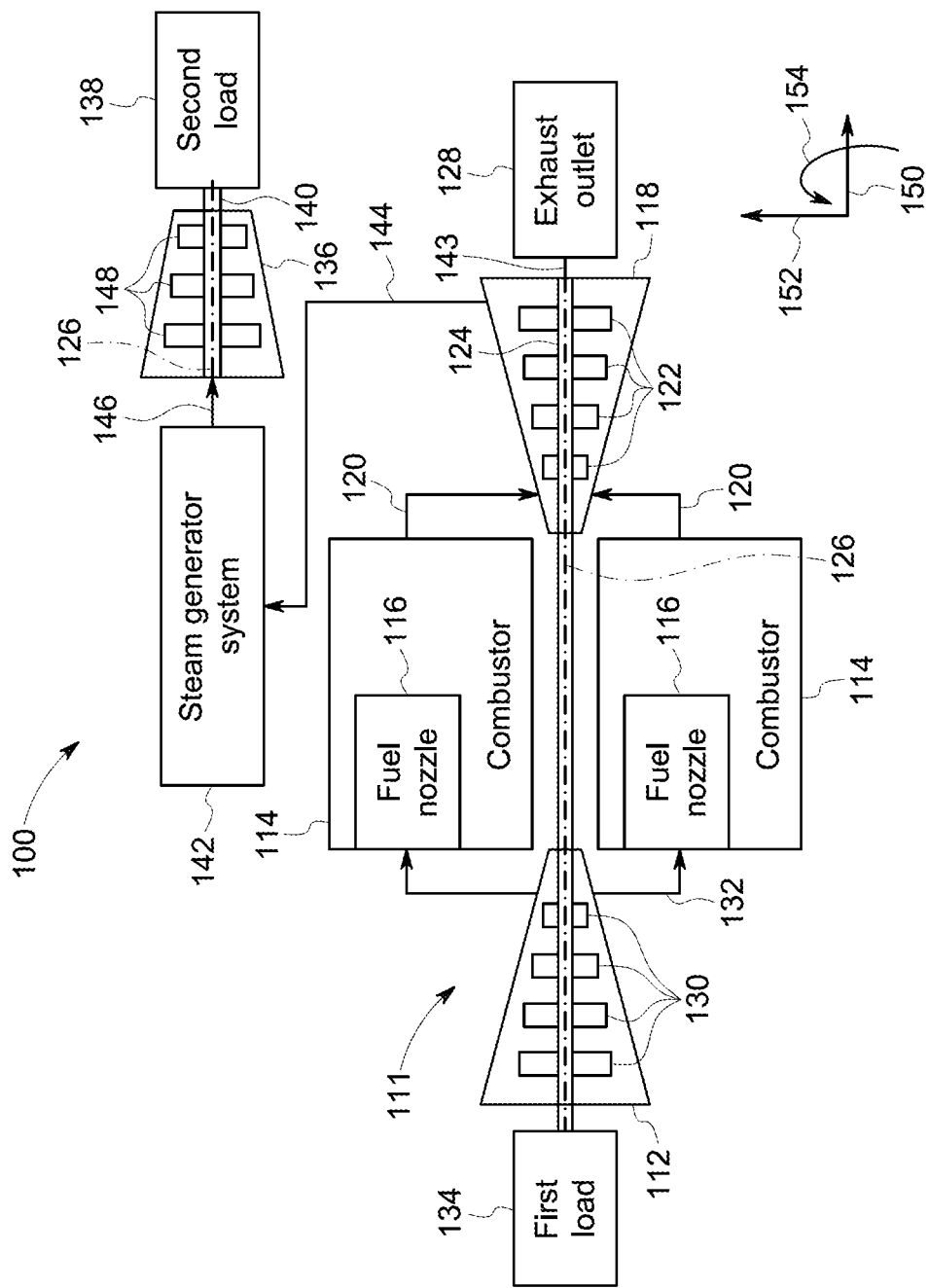
FIG. 1 illustrates a schematic diagram of a combined cycle power generation system having a gas turbine system, a steam generator system, and a steam turbine, in accordance with an embodiment.

FIG. 1 shows a schematic diagram of an embodiment of a combined cycle system 100. The combined cycle system 100 includes various turbomachines in which a face seal assembly of the present technique may be used. The turbomachines may include the face seal assembly including a first semi-circular section 202 (shown in FIG. 2) and a second semi-circular section 204 coupled to each other using the first and second lock structures 206, 208, 210, 212.

As illustrated in the embodiment of FIG. 1, the combined cycle system 100 includes a gas turbine system 111 having a compressor 112, combustors 114 having fuel nozzles 116, and a gas turbine 118. The compressor 112 includes compressor blades 130 which are coupled to a rotor 124 and the casing.

The compressor blades 130 are driven by the rotor 124 of the gas turbine 118, to compress air to generate pressurized air 132 and further to route the pressurized air 132 to the combustors 114. In certain embodiments, the compressor 112 may include a face seal assembly (not shown in FIG. 1) configured to regulate undesired leakage of the pressurized air 132 across a rotor-stator gap (e.g., a face seal clearance) within the compressor 112. The fuel nozzles 116 inject a liquid fuel and/or gas fuel, such as natural gas or syngas, into the combustors 114, where such fuel is mixed with the pressurized air 132 to generate a fuel-air mixture. The combustors 114 ignite and combust the fuel-air mixture, and then route an exhaust gas 120 into the gas turbine 118 having turbine blades 122 coupled to the rotor 124. As illustrated, the rotor 124 is also coupled to the compressor 112. As the exhaust gas 120 flows through the turbine blades 122, the rotor 124 is rotated along a central line axis 126 of the combined cycle system 100.

In an embodiment, the gas turbine 118 may also include the face seal assembly configured to regulate undesired leakage of the exhaust gas 120 across a face seal clearance within the gas turbine 118. The rotor 124 is also coupled to a first load 134 to generate power. The first load 134 may include an electrical generator, a propeller of an airplane, and/or the like.

The combined cycle system 100 further includes a steam turbine 136 and a steam generator system 142. The gas turbine 118 is coupled to the steam generator system 142 and an exhaust outlet 128, while the steam generator system 142 is coupled to the steam turbine 136. A portion 143 of the exhaust gas 120 exits the gas turbine 118 via the exhaust outlet 128. Another portion 144 of the exhaust gas 120 is transported from the gas turbine 118 to the steam generator system 142 to heat water and produce steam 146. The steam 146 produced by the steam generator system 142 flows through turbine blades 148 of the steam turbine 136. As the steam 146 flow through the turbine blades 148, a rotor 140 is rotated, thereby powering a second load 138, such as an electrical generator. In an embodiment, the steam turbine 136 may also include the face seal assembly to regulate undesired leakage of steam 146 across a face seal clearance within the steam turbine 136. The combined cycle system 100 is further described in U.S. Patent Publication No. 2018/0003067, which is incorporated by reference in its entirety.

Figure 2:
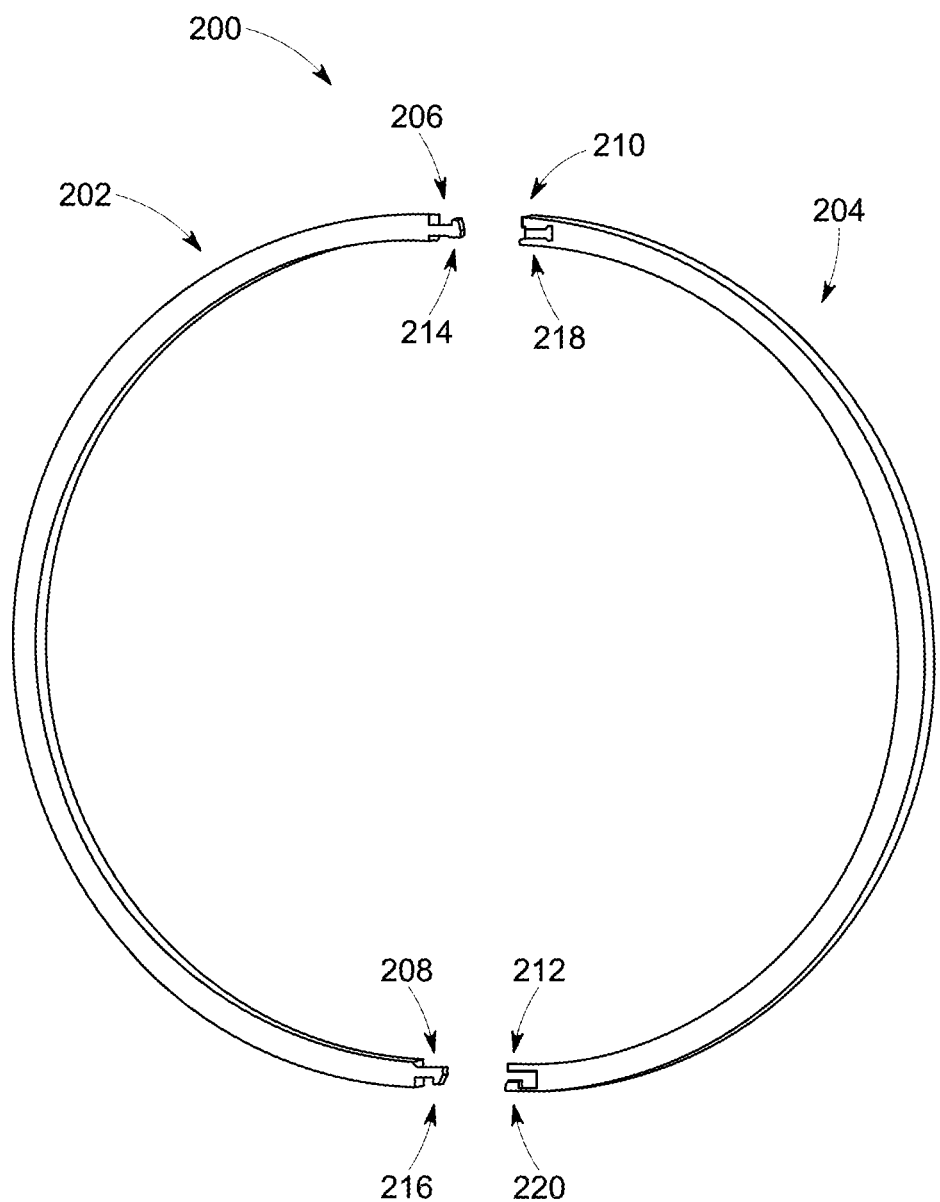
FIG. 2 illustrates a schematic diagram of a segmented piston seal, in accordance with an embodiment.

FIG. 2 illustrates a schematic diagram of a segmented piston seal 200. The segmented piston seal 200 includes a first semi-circular section (FSCS) 202. The FSCS 202 includes first locking structures 214, 216. The first locking structures 214, 216 are positioned at opposite ends 206, 208 of the FSCS 202.

The segmented piston seal 200 includes a second semi-circular section (SSCS) 204. The SSCS 204 includes second locking structures 218, 220. The second locking structures 218, 220 are positioned at opposite ends 210, 212 of the SSCS 204.

The first and second locking structures 214, 216, 218, 220 are configured to lock the FSCS 202 and the SSCS 204 together to form a piston seal. For example, the first and second locking structures 214, 216, 218, 220 are configured to lock the FSCS 202 and the SSCS 204 together to form the piston seal. For example, the first locking structures 214, 216 are configured to receive the second locking structures 218, 220. Responsive to the first locking structures 214, 216, receiving the second locking structure 218, 220 to form the piston seal.

The segmented piston seal 200 is divided into the FSCS 202 and the SSCS 204. The first and second locking structures 214, 216, 218, 220 form an assembled piston ring, which allows moment transfer between the FSCS 202 and the SSCS 204. The moment transfer represents shear stresses on the assembled piston ring.

Figure 11:
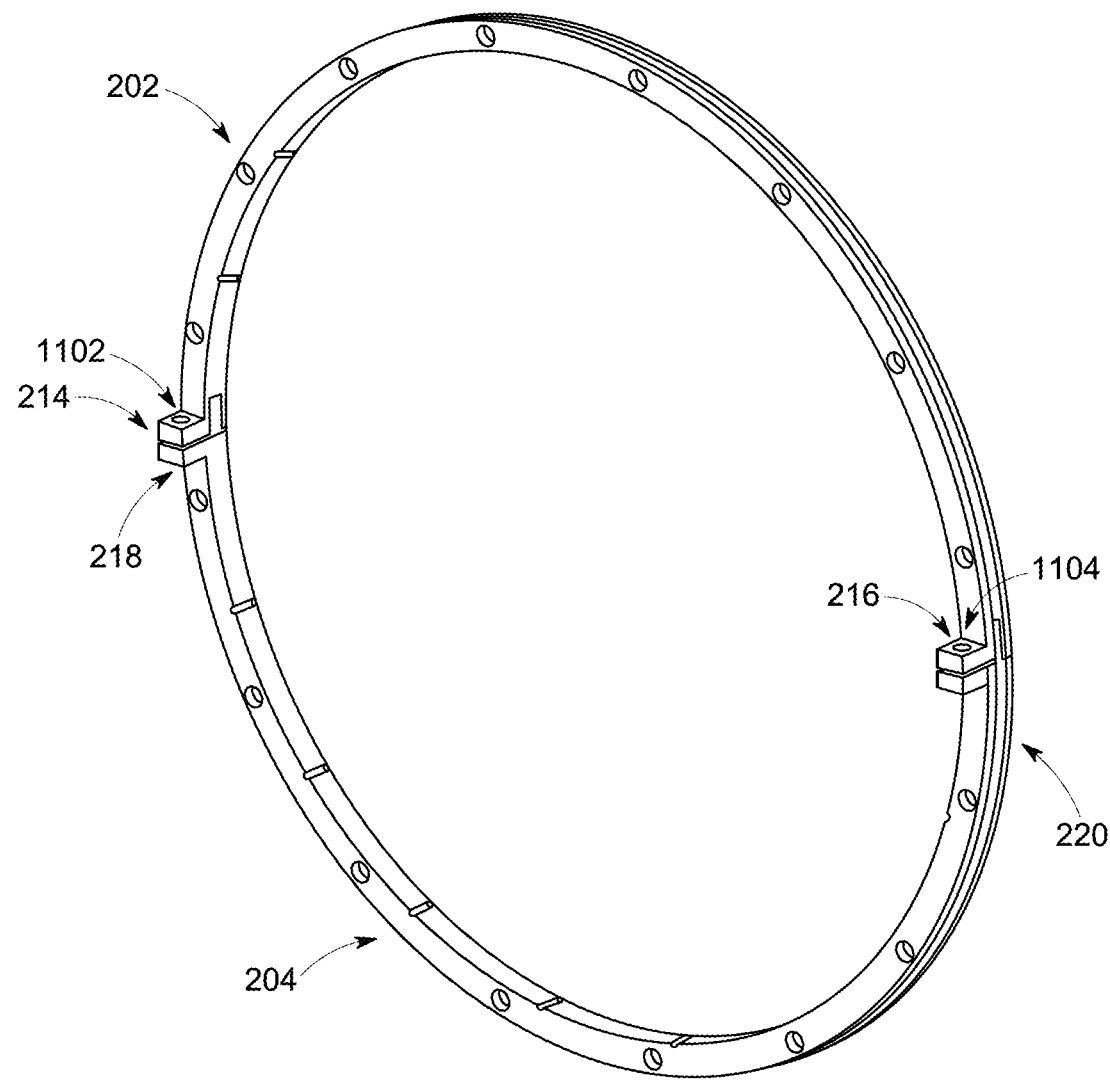
FIG. 11 illustrates a schematic diagram of the first and second locking structures of a segmented piston seal, in accordance with an embodiment.

As further described in FIG. 11, the outer circumference 1002 groove along an outer circumference of the assembled piston ring provides pressure balance to the assembled piston ring. The FSCS 202 and the SSCS 204 are segmented, which reduces a pre-load for installation of the segmented piston seal 200 on the rotor 124. The separation of the FSCS 202 and the SSCS 204 allow the reduction of the pre-load of the segment piston seal 200 on the rotor 124. The separation of the FCSC 202 and the SSCS 204 reduce the pre-load for the installation on the rotor 124. The segmented piston seal 200 preserves an internal moment continuity across the circumference of the segmented piston seal 200. For example, the first and second locking structures 214, 216, 218, 220 form the piston seal, which provides the continuous circumference of the piston seal.

For example, as further described in FIGS. 3-9, the first and second locking structures 214, 216, 218, 220 may be complementary to each other. The first and second locking structures 214, 216, 218, 220 are configured to be received by each other. For example, the first locking structures 214, 216 are configured to be received by the second locking structures 218, 220. Responsive to the first locking structures 214, 216 received by the second locking structures 218, 220, which are assembled to form the piston seal.

Figure 3:
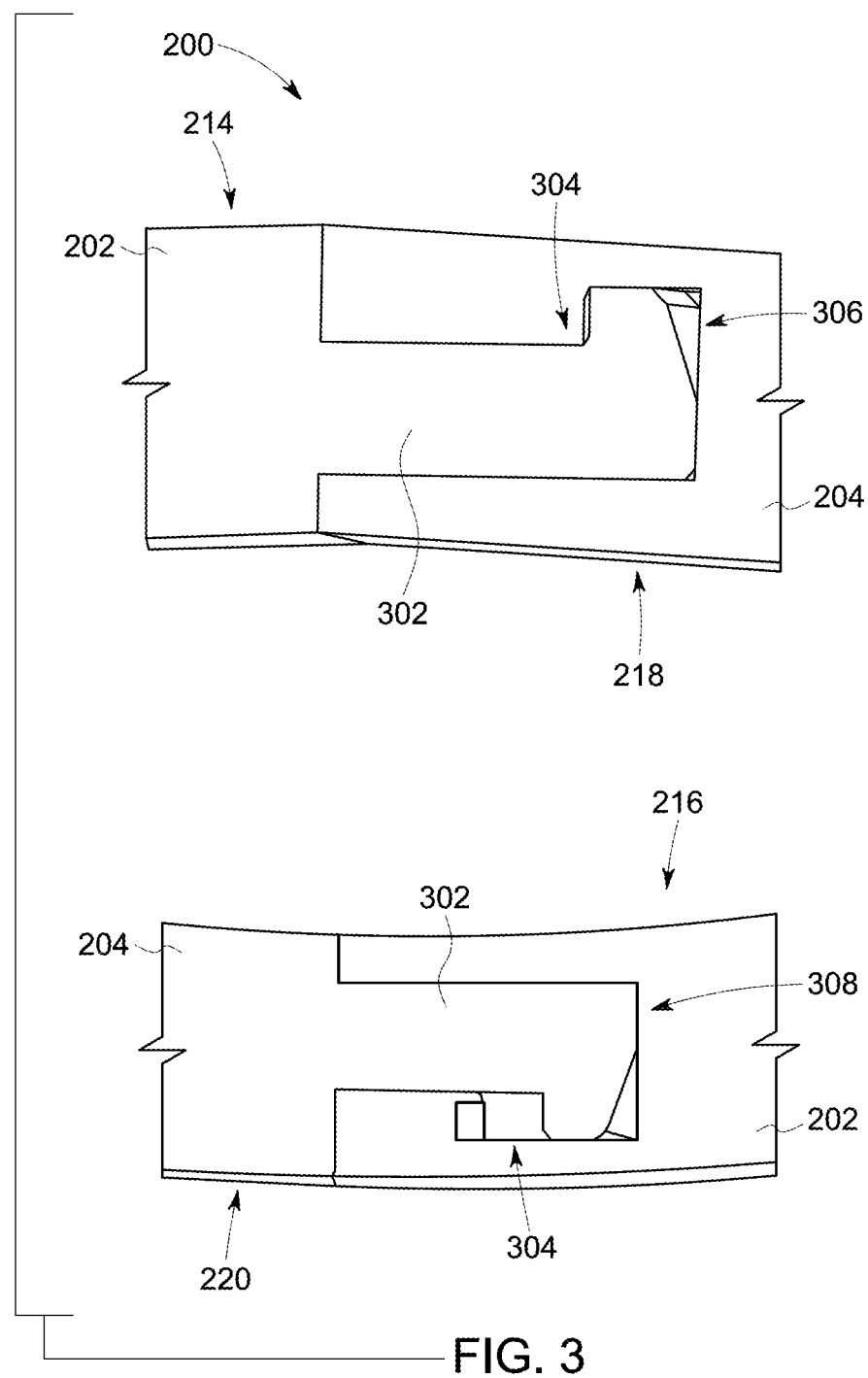
FIG. 3 illustrates a schematic diagram of a first and second locking structures of a segmented piston seal, in accordance with an embodiment.

FIG. 3 illustrates a schematic diagram of the first and second locking structures 214, 216, 218, 220 of the segmented piston seal 200. The first locking structure 214 is shown having an orthogonal arm 302. For example, the orthogonal arm 302 extends at a distal end 306 at a right angle upwards relative to the orthogonal arm 302. The first locking structure 214 is received by an orthogonal receptacle 304. The orthogonal receptacle 304 may be included in the second locking structure 218. For example, the orthogonal arm 302 of the first locking structure 214 is received by the orthogonal receptacle 304 of the second locking structure 218. The orthogonal receptacle 304 includes a right angle. For example, the orthogonal receptacle 304 has a shape similar to and/or the same as the orthogonal arm 302. Optionally, the orthogonal arm 302 may be positioned within the orthogonal receptacle 304 laterally (e.g., offset) into the orthogonal receptacle 304. Responsive to the positioning of the orthogonal arm 302 into the orthogonal receptacle 304, the segmented piston seal 200 forms the piston seal.

The second locking structure 220 is shown having an orthogonal arm 302. For example, the orthogonal arm 302 extends at a distal end 308 at a right angle upwards relative to the orthogonal arm 302. The second locking structure 220 is received by an orthogonal receptacle 304. The orthogonal receptacle 304 may be included in the first locking structure 216. For example, the orthogonal arm 302 of the second locking structure 220 is received by the orthogonal receptacle 304 of the first locking structure 216. The orthogonal receptacle 304 includes a right angle. For example, the orthogonal receptacle 304 has a shape similar to and/or the same as the orthogonal arm 302. Optionally, the orthogonal arm 302 may be positioned within the orthogonal receptacle 304 laterally (e.g., offset) into the orthogonal receptacle 304. Responsive to the positioning of the orthogonal arm 302 into the orthogonal receptacle 304, the segmented piston seal 200 forms the piston seal.

Figure 4:
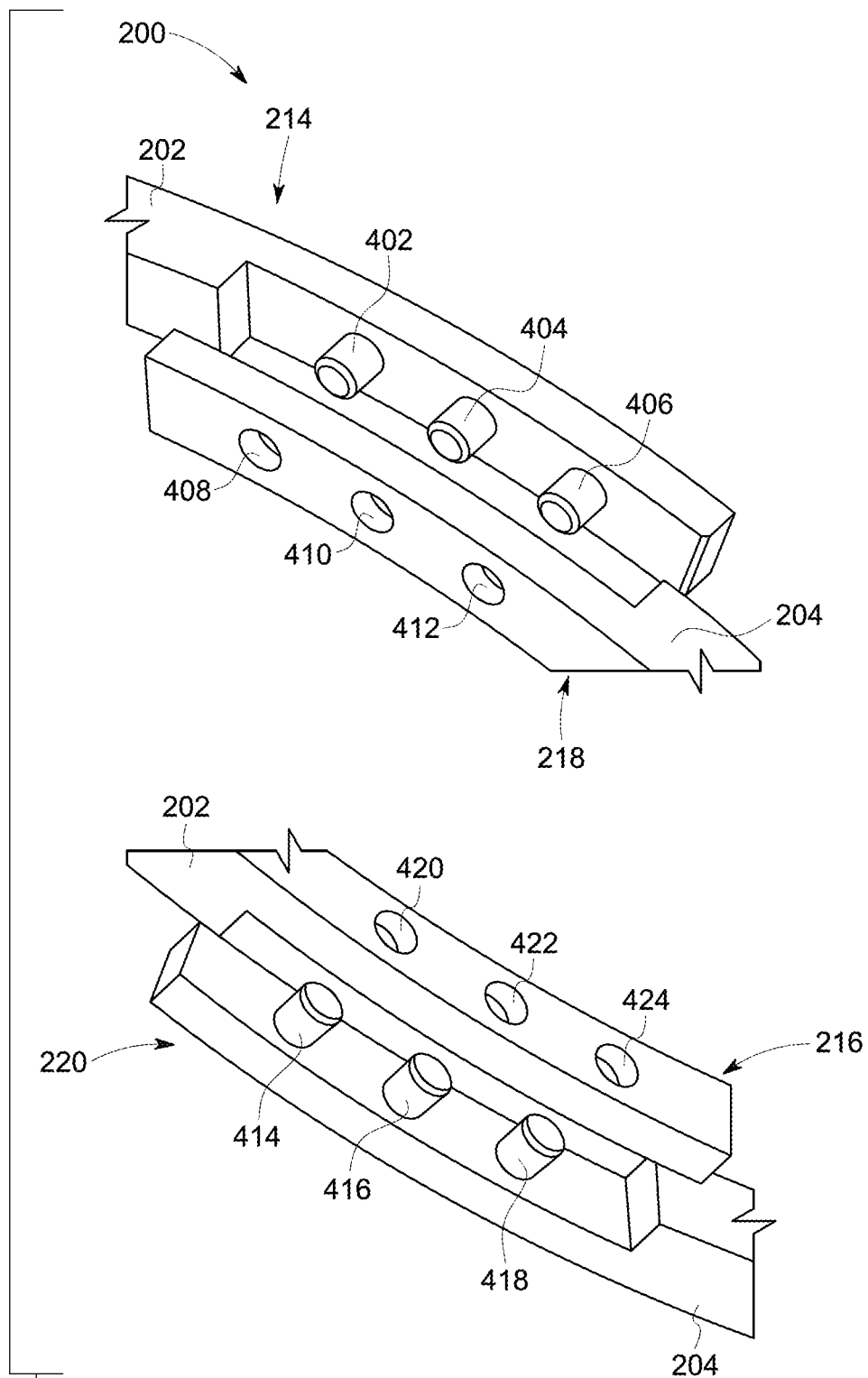
FIG. 4 illustrates a schematic diagram of the first and second locking structures of a segmented piston seal, in accordance with an embodiment.

FIG. 4 illustrates a schematic diagram of the first and second locking structures 214, 216, 218, 220 of a segmented piston seal 200. The first locking structure 214 is shown having a plurality of rods 402, 404, 406. The second locking structure 218 includes a series of receptacle holes 408, 410, 412. For example, the plurality of rods 402, 404, 406 of the first locking structure 214 is received by the series of receptacle holes 408, 410, 412 of the second locking structure 218. For example, the plurality of rods 402, 404, 406 has a shape similar to and/or the same as the series of receptacle holes 408, 410, 412. Optionally, the plurality of rods 402, 404, 406 may be positioned within the series of receptacle holes 408, 410, 412 overlaid onto the series of receptacle holes 408, 410, 412. Responsive to the positioning of the plurality of rods 402, 404, 406 into the series of receptacle holes 408, 410, 412, the segmented piston seal 200 forms the piston seal.

The second locking structure 220 is shown having the plurality of rods 402, 404, 406. The first locking structure 216 includes the series of receptacle holes 408, 410, 412. For example, the plurality of rods 402, 404, 406 of the second locking structure 220 is received by the series of receptacle holes 408, 410, 412 of the first locking structure 216. For example, the plurality of rods 402, 404, 406 has a shape similar to and/or the same as the series of receptacle holes 408, 410, 412. Optionally, the plurality of rods 402, 404, 406 may be positioned within the series of receptacle holes 408, 410, 412 overlaid onto the series of receptacle holes 408, 410, 412. Responsive to the positioning of the plurality of rods 402, 404, 406 into the series of receptacle holes 408, 410, 412, the segmented piston seal 200 forms the piston seal.

Figure 5:
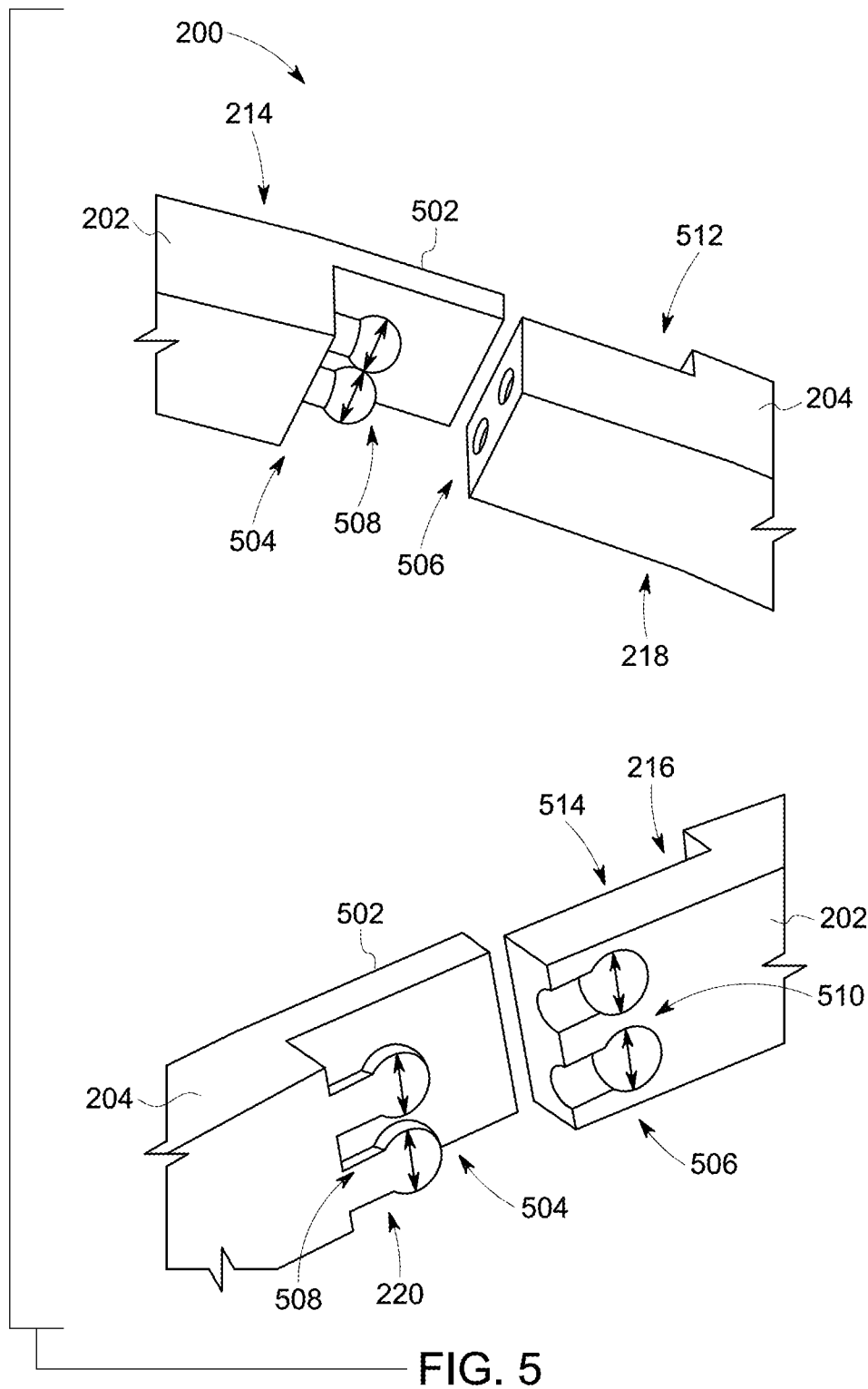
FIG. 5 illustrates a schematic diagram of the first and second locking structures of a segmented piston seal, in accordance with an embodiment.

FIG. 5 illustrates a schematic diagram of the first and second locking structures 214, 216, 218, 220 of the segmented piston seal 200. The first locking structure 214 is shown having a plurality of rods 504. The plurality of rods 504 include spheres. The spheres include expanded diameters 508. For example, the plurality of rods 504 extend away from the first locking structure 214 and form spheres. The spheres include the expanded diameters 508. For example, the spheres extend away from the first locking structure 214 and have the expanded diameters 508. The diameter of the spheres of the plurality of rods 504 expand at the spheres to form the expanded diameters 510 of corresponding holes 506. The corresponding holes 506 are included in the second locking structure 204. For example, the plurality of rods 504 are configured to enter the corresponding holes 506.

The first and second locking structures 216, 220 include planar members 502. The planar members 502 are configured to be received by a receiving orthogonal structures 512, 514. Optionally, the planar members 502 may be configured to guide the plurality of rods 504 towards the corresponding holes 506.

The first locking structure 216 includes the corresponding holes 506. For example, the plurality of rods 504 are configured to be received by the corresponding holes 506. The corresponding holes 506 include the expanded diameters 506 to receive the plurality of rods 504. For example, the plurality of rods 504 have a shape similar to and/or the same as the corresponding holes 506. Optionally, the plurality of rods 504 may be positioned into the corresponding holes 506. Responsive to the positioning of the plurality of rods 504 into the corresponding holes 506, the segmented piston seal 200 forms the piston seal.

Figure 6:
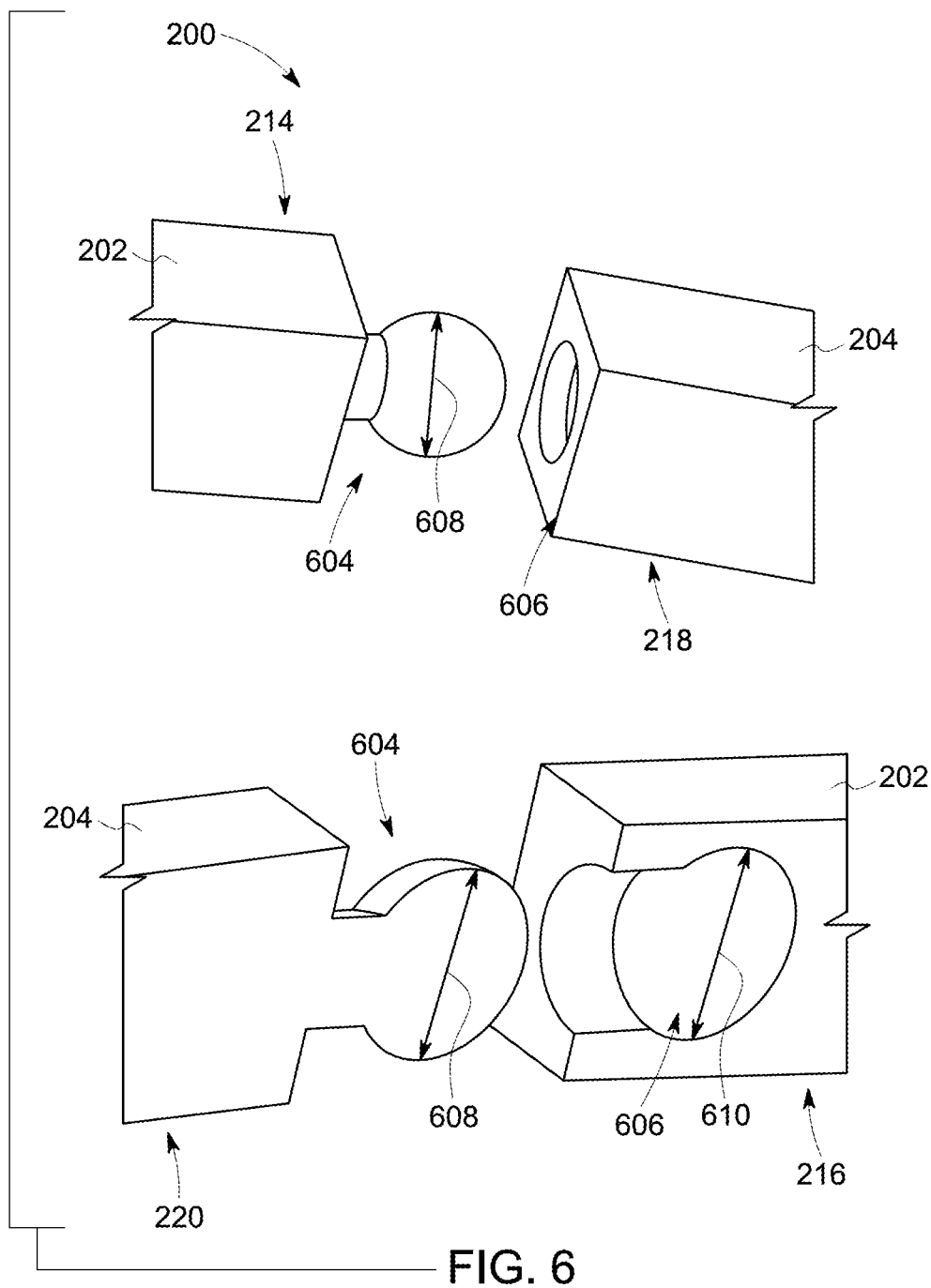
FIG. 6 illustrates a schematic diagram of the first and second locking structures of a segmented piston seal, in accordance with an embodiment.

FIG. 6 illustrates a schematic diagram of the first and second locking structures 214, 216, 218, 220 of a segmented piston seal 200. The first locking structure 214 is shown having a rod 604. The rod 604 includes a sphere. The sphere includes an expanded diameter 608. For example, the rod 604 extends away from the first locking structure 214 and forms the sphere. The sphere extends away from the first locking structure 214 and includes the sphere having the expanded diameter 608. The diameter of the sphere expands to include the expanded diameter 608. The second locking structure 204 includes corresponding holes 606. The corresponding holes 606 of the second locking structure 218 are configured to receive the rod 604. For example, the corresponding holes 606 include an expanded diameter 610 to receive the rod 604. The rod 604 has a shape similar to and/or the same as the corresponding hole 606.

The first locking structure 216 includes the corresponding hole 606. For example, the rod 604 of the second locking structure 220 are configured to receive the corresponding hole 606. The corresponding hole 606 includes an expanded diameter 610 to receive the rod 604. For example, the rod 604 has a shape similar to and/or the same as the corresponding hole 606. The corresponding hole 606 includes an expanded diameter 610 to receive the rod 604. The rod 604 has a shape similar to and/or the same as the corresponding hole 606. Optionally, the rod 604 may be positioned into the corresponding hole 606. Responsive to the positioning of the rod 604 into the corresponding hole 606, the segmented piston seal 200 forms the piston seal.

Figure 7:
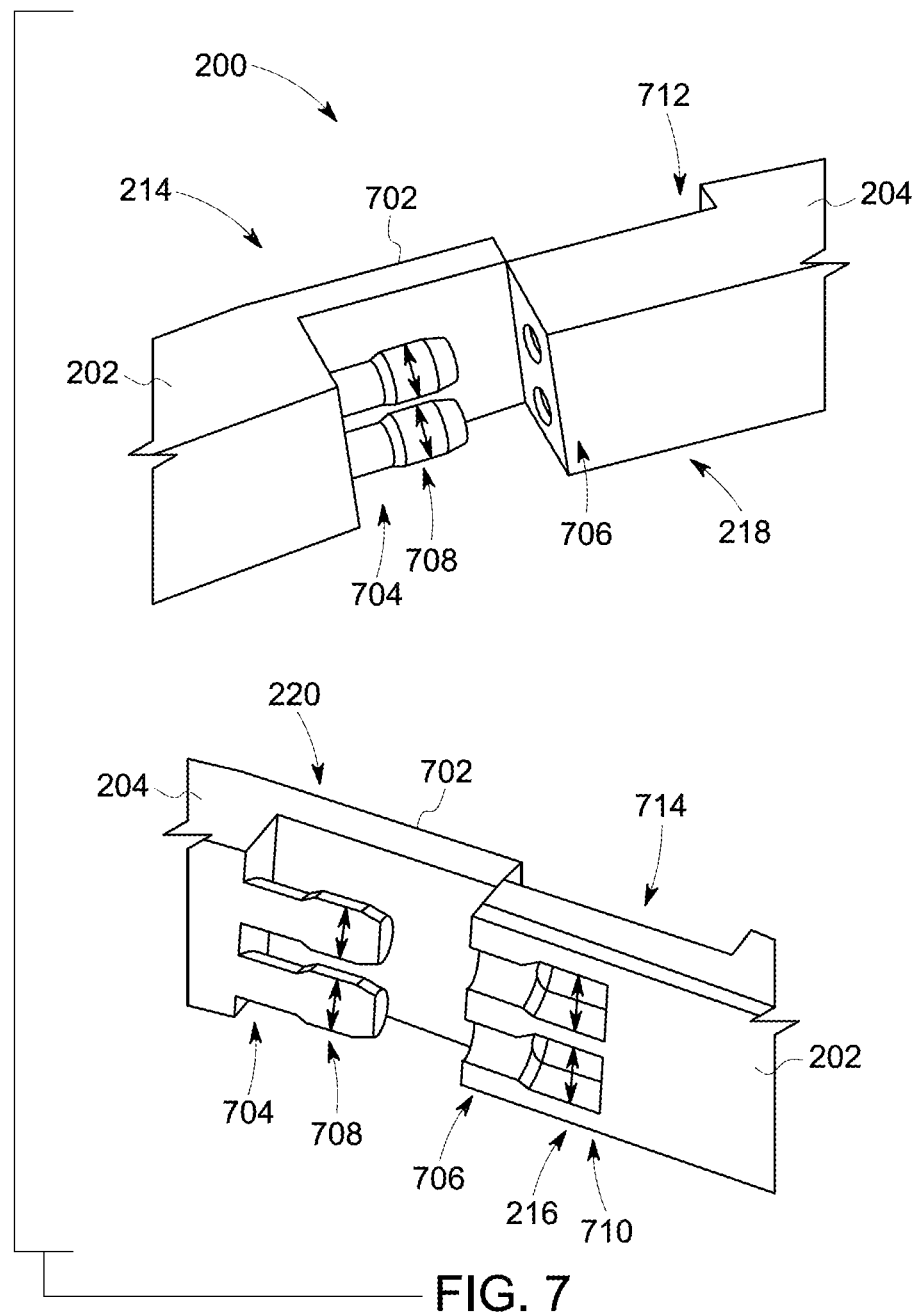
FIG. 7 illustrates a schematic diagram of the first and second locking structures of a segmented piston seal, in accordance with an embodiment.

FIG. 7 illustrates a schematic diagram of the first and second locking structures 214, 216, 218, 220 of a segmented piston seal 200. The first locking structure 214 is shown having a plurality of rods 704. The plurality of rods 704 include expanded diameters 708. For example, the plurality of rods 704 extend away from the first locking structure 214 and have expanded diameters 708. For example, the plurality of rods 704 include the expanded diameters 608. For example, the plurality of rods 704 extend away from the first locking structure 214 and have the expanded diameters 708. The diameter of the plurality of rods 704 expand to form the expanded diameters 708 of corresponding holes 706. The corresponding holes 706 are included in the second locking structure 218. For example, the plurality of rods 704 are configured to enter the corresponding holes 706. Optionally, the plurality of rods 704 may be positioned into the corresponding holes 706. Responsive to the positioning of the plurality of rods 704 into the corresponding holes 706, the segmented piston seal 200 forms the piston seal.

The first and second locking structures 216, 220 include planar members 702. The planar members 702 are configured to be received by a receiving orthogonal structures 712, 714. Optionally, the planar members 702 may be configured to guide the plurality of rods 704 towards the corresponding holes 706.

The first locking structure 216 includes the corresponding holes 706. For example, the plurality of rods 704 are configured to be received by the corresponding holes 706. The corresponding holes 706 include the expanded diameters 708 to receive the plurality of rods 704. The corresponding holes 706 include an expanded diameter 710 to receive the plurality of rods 704. The plurality of rods 704 have a shape similar to and/or the same as the corresponding holes 706. Optionally, the plurality of rods 704 may be positioned into the corresponding holes 706. Responsive to the positioning of the plurality of rods 704 into the corresponding holes 706, the segmented piston seal 200 forms the piston seal.

Figure 8:
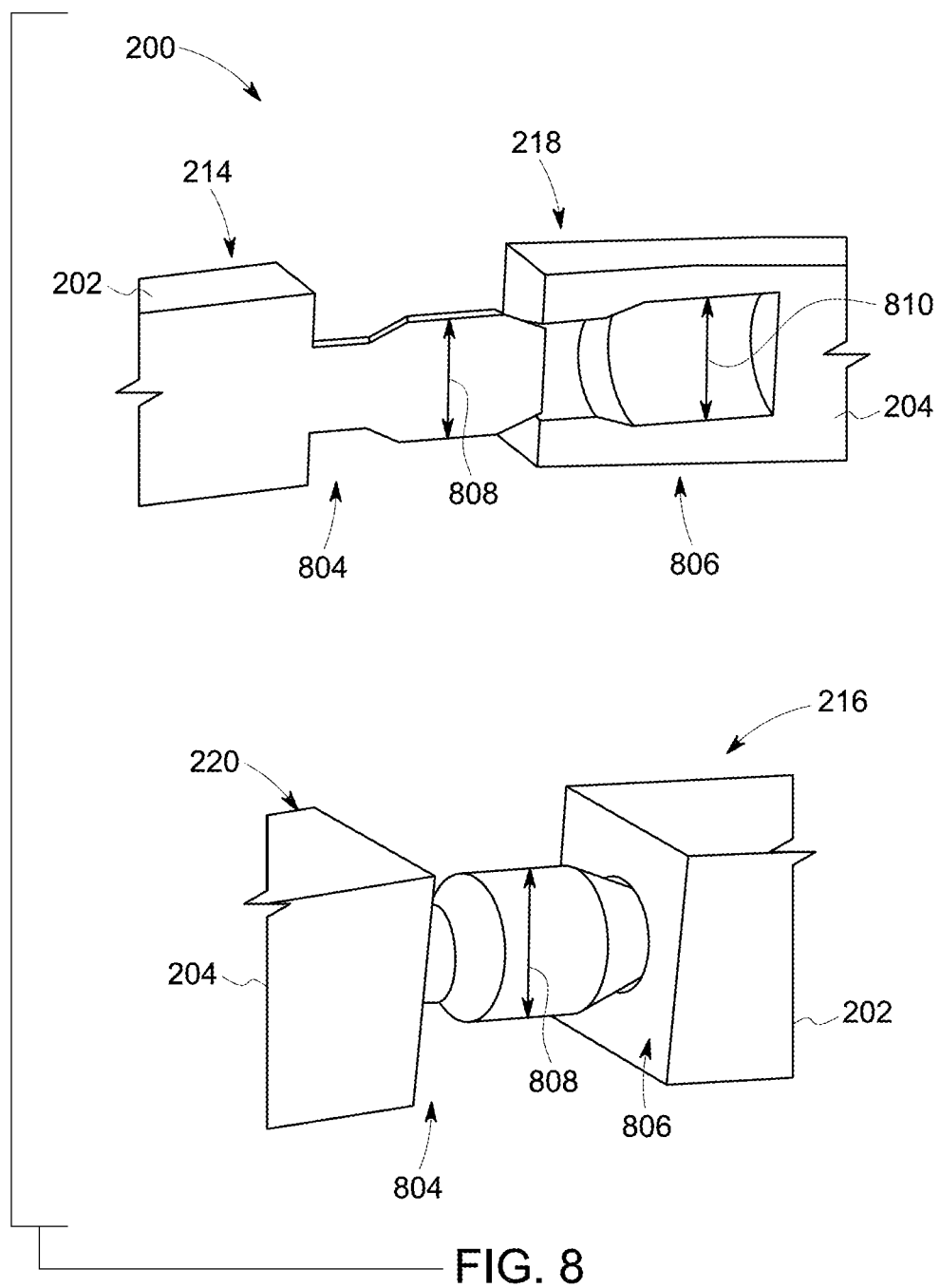
FIG. 8 illustrates a schematic diagram of the first and second locking structures of a segmented piston seal, in accordance with an embodiment.

FIG. 8 illustrates a schematic diagram of the first and second locking structures 214, 216, 218, 220 of a segmented piston seal 200. The first locking structure 214 is shown having a rod 804. The rod 804 includes an expanded diameter 808. For example, the rod 804 extends away from the first locking structure 214 having a diameter that forms the expanded diameter 808. The diameter of the rod 804 expands to include the expanded diameter 808. The second locking structure 218 includes corresponding hole 806. The corresponding hole 806 of the second locking structure 218 are configured to receive the rod 804. For example, the corresponding hole 806 includes the expanded diameter 808 to receive the rod 804. The rod 804 has a shape similar to and/or the same as the corresponding hole 806.

The first locking structure 216 includes the corresponding hole 806. For example, the rod 804 of the second locking structure 220 are configured to receive the corresponding hole 806. The corresponding hole 806 includes an expanded diameter 808 to receive the rod 804. For example, the rod 804 has a shape similar to and/or the same as the corresponding hole 806. The corresponding hole 806 includes an expanded diameter 808 to receive the rod 804. The rod 804 has a shape similar to and/or the same as the corresponding hole 806. Optionally, the rod 804 may be positioned into the corresponding hole 806. Responsive to the positioning of the rod 804 into the corresponding hole 806, the segmented piston seal 200 forms the piston seal.

Figure 9:
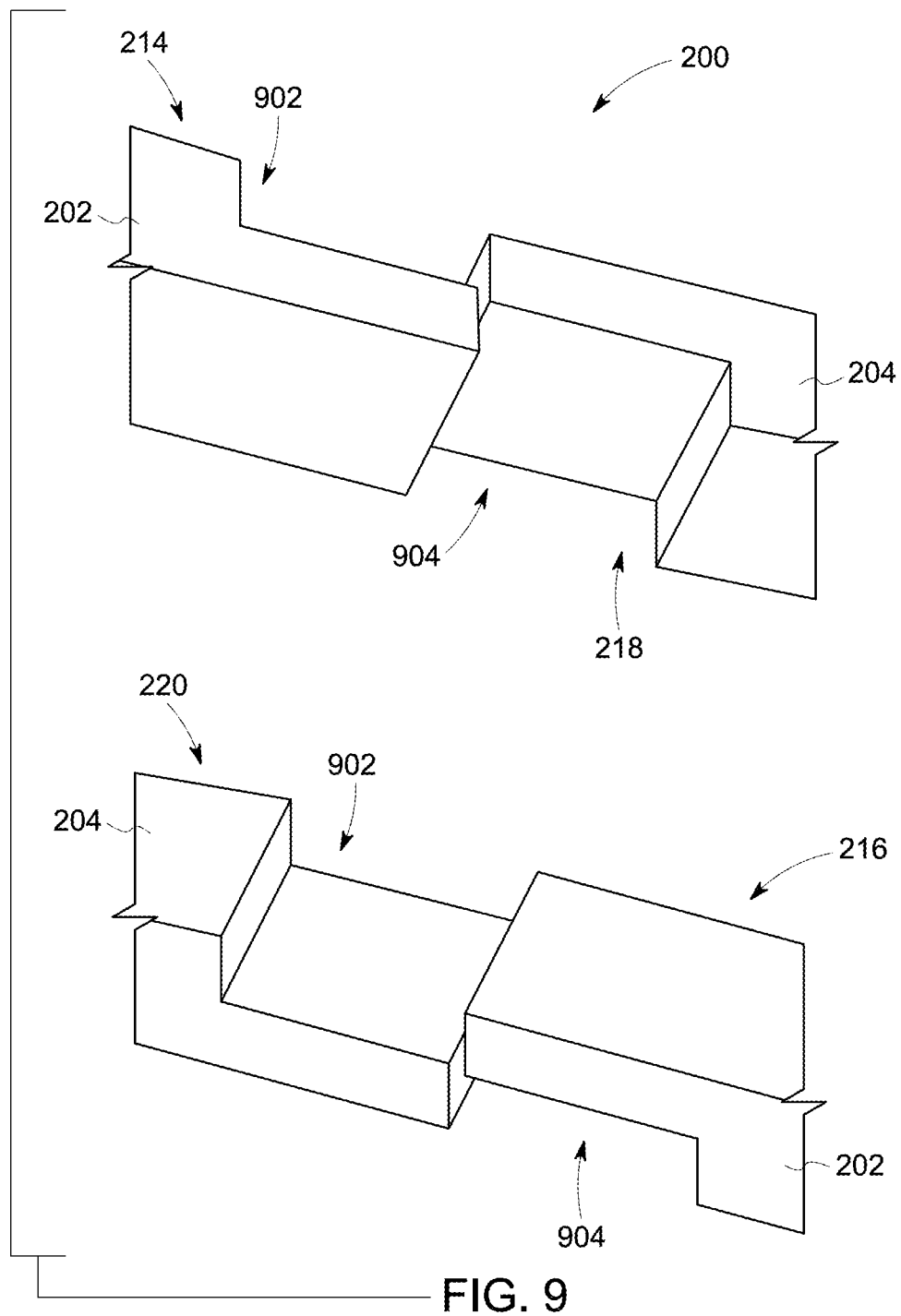
FIG. 9 illustrates a schematic diagram of the first and second locking structures of a segmented piston seal, in accordance with an embodiment.

FIG. 9 illustrates a schematic diagram of the first and second locking structures 214, 216, 218, 220 of a segmented piston seal 200. The first locking structure 214 is shown having an orthogonal cut-out 902. The orthogonal cut-out 902 includes a right angle. For example, the orthogonal cut-out 902 extends and is received by an orthogonal cut-out 904. The orthogonal cut-out 904 may be included in the second locking structure 218. For example, the orthogonal cut-out 902 of the first locking structure 214 is received by the orthogonal cut-out 904 of the second locking structure 218. For example, the orthogonal cut-out 904 has a shape similar to and/or the same as the orthogonal cut-out 902. Optionally, the orthogonal cut-out 902 may be positioned within the orthogonal cut-out 904 laterally (e.g., offset) into the orthogonal cut-out 904. Responsive to the positioning of the orthogonal cut-out 902 into the orthogonal cut-out 904, the segmented piston seal 200 forms the piston seal.

The second locking structure 220 is shown having an orthogonal cut-out 902. For example, the orthogonal cut-out 902 extends to form a right angle. The second locking structure 220 is received by an orthogonal cut-out 904. The orthogonal cut-out 904 may be included in the first locking structure 216. For example, the orthogonal cut-out 902 of the second locking structure 220 is received by the orthogonal cut-out 904 of the first locking structure 216. The orthogonal cut-out 904 includes a right angle. For example, the orthogonal cut-out 904 has a shape similar to and/or the same as the orthogonal cut-out 902. Optionally, the orthogonal cut-out 902 may be positioned within the orthogonal cut-out 904 laterally (e.g., offset) into the orthogonal receptacle 304. Responsive to the positioning of the orthogonal cut-out 902 into the orthogonal cut-out 904, the segmented piston seal 200 forms the piston seal.

Figure 10:
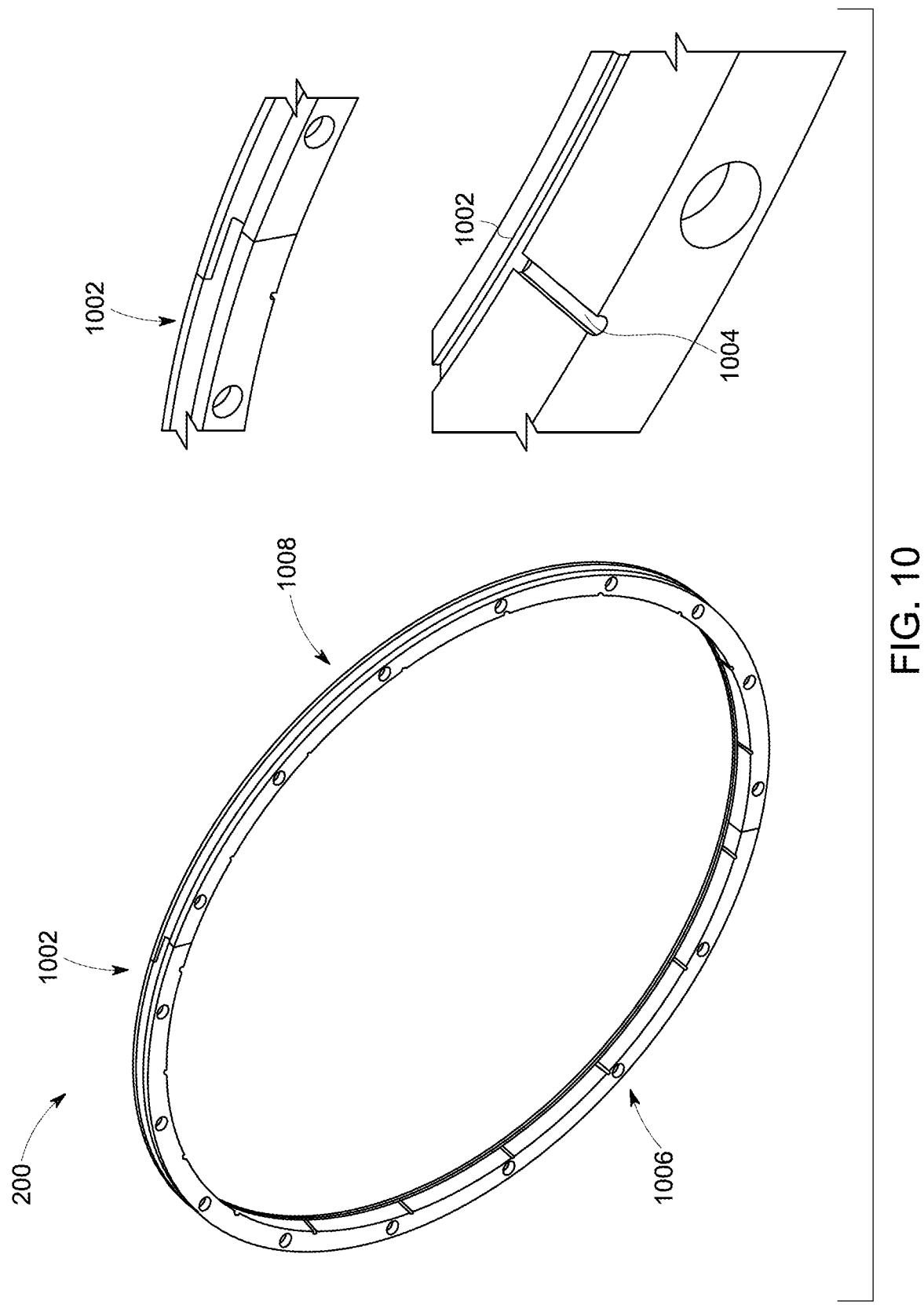
FIG. 10 illustrates a schematic diagram of an outer circumference of a segmented piston seal, in accordance with an embodiment.

FIG. 10 illustrates a schematic diagram of an outer circumference 1002 of the segmented piston seal 200. The outer circumference 1002 includes a groove. The groove is configured to extend on a surface of the outer circumference 1002. Responsive to the segment piston seal 200 positioned on the rotor 124 (shown in FIG. 1), the groove allows a piston ring to handle pressure exerted on the segmented piston seal 200. For example, during operation of the combined cycle system 100, the segmented piston seal 200 receives pressure along both sides 1006, 1008 of the segmented piston seal 200. A piston ring is configured to be positioned within the groove, which allows the segmented piston seal 200 to handle the pressure and friction during operation of the rotor 124. The pressure along both sides 1006, 1008 of the segmented piston seal 200 may be different. For example, the side 1006 may include high pressure, and the side 1008 may include low pressure relative to the side 1006. For example, the outer circumference 1002 allows the piston ring to provide support for the segmented piston seal 200. The piston ring being positioned within the groove of the outer circumference 1002 allows the segmented piston ring 200 not to be twisted and/or to lower friction of the segmented piston ring 200. Perpendicular to the groove, is a groove 1004. The groove 1004 is configured to provide additional pressure balancing to the segmented piston ring 200. The groove of the outer circumference 1002 reduces the pressure loading on the piston ring, which also leads to a reduction in friction forces of the segmented piston seal 200 relative to the piston ring.

FIG. 11 illustrates a schematic diagram to install the segmented piston seal 200 to be installed horizontally on the rotor 124 of the combined cycle system 100. Optionally, the segmented piston seal 200 may include springs 1102, 1104 within the first and second locking structures 214, 216, 218, 220. For example, the springs 1102, 1104 are configured to lock the FSCS 202 and the SSCS 204 together to form the piston seal.

For example, the first locking structure 214 includes an aperture. The second locking structure 218 includes spring 1102 which enters through the aperture of the first locking structure 214. In another example, the second locking structure 220 includes an aperture. The first locking structure 216 includes spring 1104 which enters through the aperture of the second locking structure 220.

Figure 12:
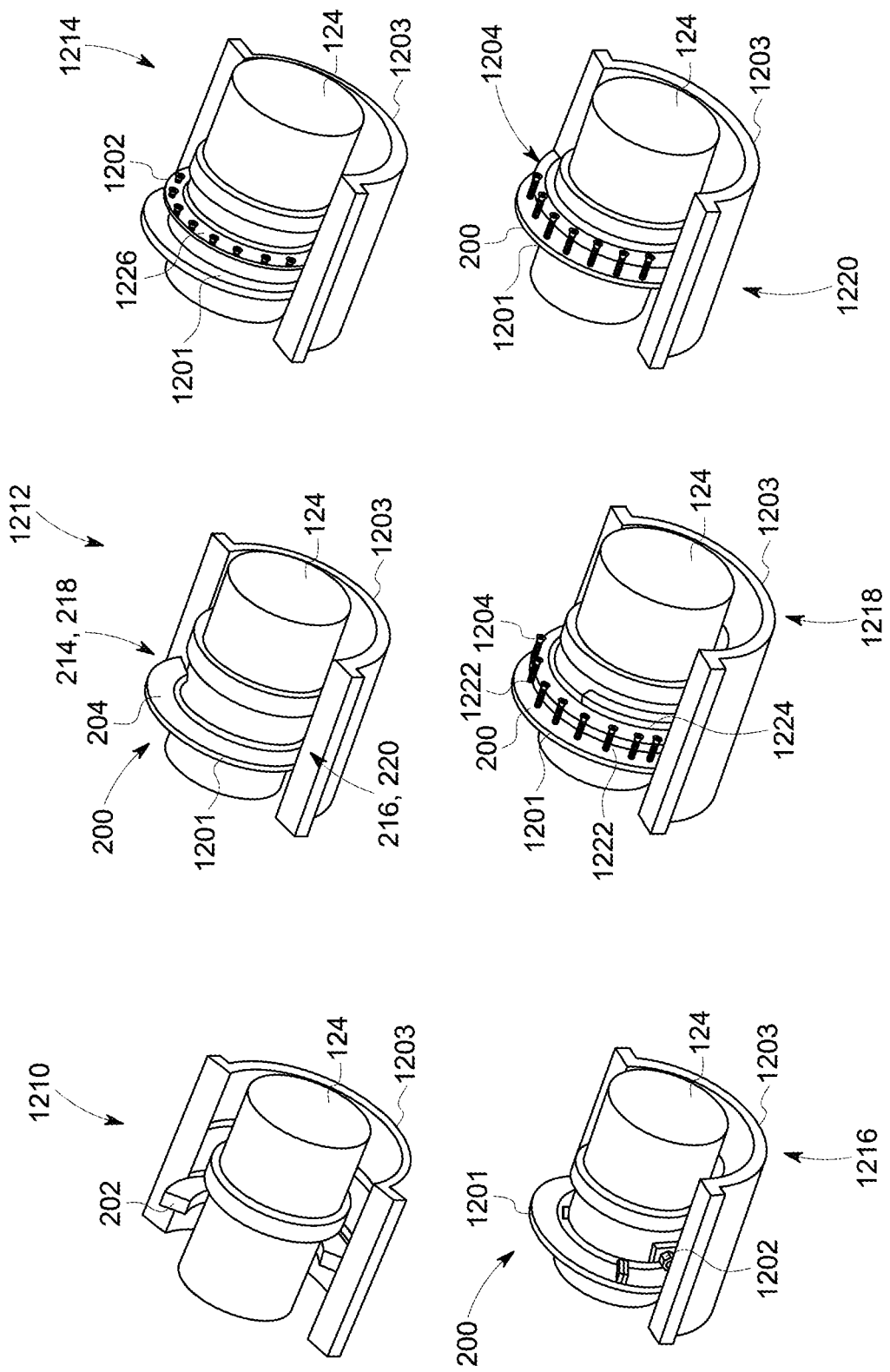
FIG. 12 illustrates a schematic diagram to install a segmented piston seal to be installed horizontally on a rotor of a combined cycle system.

FIG. 12 illustrates a schematic diagram to install the segmented piston seal 200 to be installed horizontally on the rotor 124 of the combined cycle system 100. For example, the combined cycle system 100 includes the rotor 124 of the combined cycle system 100 positioned horizontally.

At 1210, the FSCS 202 is positioned along the rotor 124. For example, the FSCS 202 is positioned such that the FSCS 202 is interposed between the rotor 124 and a casing 1203. The casing 1203 may extend between the combustors 114.

At 1212, the SSCS 204 is positioned to align with the first and second locking structures 214, 216, 218, 220. For example, the FSCS and SSCS 202, 204 are positioned to align the first locking structure 214, 216 with the second locking structure 218, 220. The FSCS 202 and the SSCS 204 are aligned with respect to each other. For example, the first locking structure 214, 216 is configured to be received by the second locking structure 218, 220. The first and second locking structures 214, 216, 218, 220 are configured to lock the FSCS 202 and the SSCS 204 together to form a piston seal 1201.

At 1214, a portion of the secondary seal 1202 is positioned adjacent to the piston seal 1201. The portion of the secondary seal 1202 includes a lip 1226. The lip 1226 is configured to be positioned underneath the piston seal 1201. The portion of the secondary seal 1202 includes an indentation around a circumference of the portion of the secondary seal 1202. The indentation includes at least one of hydrostatic parts, multi-segment seals, and/or the like.

At 1216, the rotor 124 is rotated. For example, the rotor 124 is rotated to expose a missing section of the portion of the secondary seal 1202.

At 1218, a remaining portion of the secondary seal 1204 is positioned adjacent to the piston seal 1201. For example, the portions of the secondary seal 1202, 1204 form the secondary seal 1224. The secondary seal 1224 is operably coupled to the piston seal 1201. The piston seal 1201 is operably coupled to the secondary seal 1224 via a plurality of springs 1222.

At 1220, operably coupled to a portion of secondary seal 1202. The portion of secondary seal 1202 is operably coupled to the piston seal 1201 via one or more springs 1222. For example, the one or more springs 1222 are operably coupled to apertures around a circumference of the secondary seal 1224. The one or more springs 1222 are positioned within the apertures of the secondary seal 1224. Optionally, the one or more springs 1222 may be bolted to the apertures.

Figure 13:
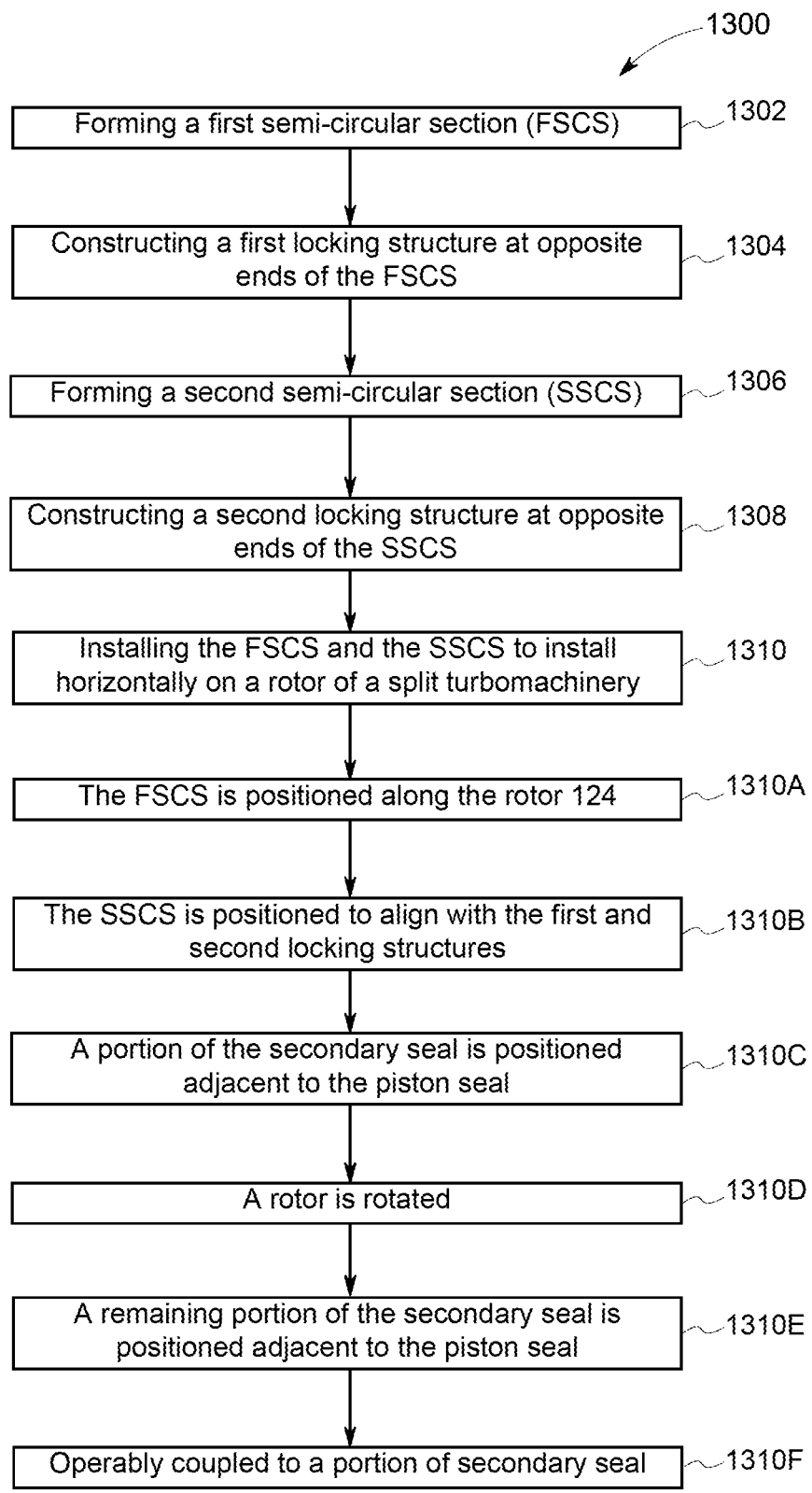
FIG. 13 illustrates a method to manufacture a segmented piston seal, in accordance with an embodiment.

FIG. 13 illustrates a method 1300 to manufacture the segmented piston seal 200. In one embodiment, a person of ordinary skill in the art can use the flowchart of the method 1300 to write one or more software applications, certain steps may be omitted or added, certain steps may be combined, certain steps may be performed concurrently, certain steps may be split into multiple steps, or certain steps may be performed in a different order.

Beginning at 1302, the forming the FSCS 202. For example, the FSCS 202 is a first semi-circular section, as shown in FIG. 2.

At 1304, constructing the first locking structures 214, 216 at opposite ends of the FSCS 202. The first locking structures 214, 216 are positioned at opposite ends 206, 208 of the FSCS 202.

At 1306, the forming the SSCS 204. For example, the SSCS 204 is a second semi-circular section, as shown in FIG. 2.

At 1308, constructing the second locking structures 218, 220 at opposite ends of the SSCS 204. The second locking structures 218, 220 are positioned at opposite ends 210, 212 of the SSCS 204.

Optionally, constructing the first and second locking structures 214, 220 may include orthogonal arms 302 (shown in FIG. 3). For example, the orthogonal arm 302 extends at a distal end 306 at a right angle. The first and second locking structures 216, 218 may include orthogonal receptacles 304. The orthogonal receptacles 304 are configured to receive the orthogonal arms 302 to form the piston seal.

Additionally or alternatively, constructing the first and second locking structures 214, 220 to include a plurality of rods 402, 404, 406 (shown in FIG. 4). And forming receptacle holes 408, 410, 412 of the first and second locking structures 216, 218 that are configured to receive the plurality of rods 402, 404, 406. The plurality of rods 402, 404, 406 are configured to be received by the receptacle holes 408, 410, 412 to form the piston seal.

Optionally, constructing the first and second locking structures 214, 220 to include a plurality of rods 504 (shown in FIG. 5) that include spheres with expanded diameters 508. And forming the receiving holes 506 at the first and second locking structures 216, 218 having an expanded diameter 510 to receive the plurality of rods 504.

Additionally or alternatively, constructing the first and second locking structures 214, 220 to include a rod 604 (shown in FIG. 6) that includes a sphere with expanded diameter 608. And forming the receiving holes 606 at the first and second locking structures 216, 218 having an expanded diameter 610 to receive the rod 604.

Optionally, constructing the first and second locking structures 214, 220 to include a plurality of rods 704 (shown in FIG. 7) having expanded diameters 708. And forming the receiving holes 706 at the first and second locking structures 216, 218 having an expanded diameter 708 to receive the plurality of rods 704.

Additionally or alternatively, constructing the first and second locking structures 214, 220 to include a rod 804 (shown in FIG. 8) having expanded diameter 808. And forming the corresponding hole 806 at the first and second locking structures 216, 218 having an expanded diameter 808 to receive the rod 804

Optionally, constructing the first and second locking structures 214, 220 to include first and second orthogonal cut-outs 902. And forming at the first and second locking structures 216, 218 orthogonal cut-outs 904 that are configured to be received by the orthogonal cut-outs 902, 904.

At 1310, installing the FSCS 202 and the SSCS 204 to install horizontally on the rotor 124 of the combined cycle system 100.

At 1310A, the FSCS 202 is positioned along the rotor 124. For example, the FSCS 202 is positioned such that the FSCS 202 is interposed between the rotor 124 and a casing 1203 (shown in FIG. 12).

At 1310B, the SSCS 204 is positioned to align with the first and second locking structures 214, 216, 218, 220. For example, the FSCS and SSCS 202, 204 are positioned to align the first locking structure 214, 216 with the second locking structure 218, 220. The FSCS 202 and the SSCS 204 are aligned with respect to each other. For example, the first locking structure 214, 216 is configured to be received by the second locking structure 218, 220. The first and second locking structures 214, 216, 218, 220 are configured to lock the FSCS 202 and the SSCS 204 together to form a piston seal 1201.

At 1310C, a portion of the secondary seal 1202 is positioned adjacent to the piston seal 1201. The portion of the secondary seal 1202 includes a lip 1226. The lip 1226 is configured to be positioned underneath the piston seal 1201. The portion of the secondary seal 1202 includes an indentation around a circumference of the portion of the secondary seal 1202. The indentation includes at least one of hydrostatic parts, multi-segment seals, and/or the like.

At 1310D, the rotor 124 is rotated. For example, the rotor 124 is rotated to expose a missing section of the portion of the secondary seal 1202.

At 1310E, a remaining portion of the secondary seal 1204 is positioned adjacent to the piston seal 1201. For example, the portions of the secondary seal 1202, 1204 form the secondary seal 1224. The secondary seal 1224 is operably coupled to the piston seal 1201. The piston seal 1201 is operably coupled to the secondary seal 1224 via a plurality of springs 1222.

At 1310F, operably coupled to a portion of secondary seal 1202. The portion of secondary seal 1202 is operably coupled to the piston seal 1201 via one or more springs 1222. For example, the one or more springs 1222 are operably coupled to apertures around a circumference of the secondary seal 1224. The one or more springs 1222 are positioned within the apertures of the secondary seal 1224. Optionally, the one or more springs 1222 may be bolted to the apertures.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A segmented piston seal comprising:
   a first semi-circular section (FSCS) that includes first locking structures at opposite ends of the FSCS, the first locking structures formed as a unitary body with the FSCS, each of the first locking structures comprising an orthogonal arm extending a distance away from the FSCS, each orthogonal arm having an inner surface facing toward a center axis of the piston seal and an exterior surface facing away from the center axis of the piston seal, wherein a distal end of each orthogonal arm includes an angle segment extending from the exterior surface a distance away from the center axis of the piston seal;
   a second semi-circular section (SSCS) that is separate from the FSCS, the SSCS including second locking structures at opposite ends of the SSCS, the second locking structures formed as a unitary body with the SSCS, each of the second locking structures comprising an orthogonal receptacle configured to receive the corresponding orthogonal arm of the FSCS, wherein each of the orthogonal receptacles includes a corresponding angle segment configured to receive the angle segment of the distal end of the corresponding orthogonal arm of the first locking structures, wherein the first locking structures are configured to be coupled with the second locking structures to lock the FSCS and the SSCS together to form a piston seal around a horizontally split turbomachine,
   wherein the angle segment of one of the second locking structures has an interior surface that is larger than an interior surface of the angle segment of the other second locking structure such that the segmented piston seal includes a gap disposed between the one second locking structure and the corresponding first locking structure, wherein the corresponding first locking structure operably coupled with the one second locking structure is allowed to move in a tangential direction within the angle segment away from a mating surface of the angle segment of the one second locking structure, and the other first locking structure operably coupled with the other second locking structure is prohibited from moving in the tangential direction away from a mating surface of the angle segment of the other second locking structure responsive to the second locking structures receiving the first locking structures, wherein the first locking structures coupled with the second locking structures form one or more load structures and one or more moment structures, wherein the orthogonal arm of the first locking structures includes a plurality of rods extending a distance away from the orthogonal arm in a direction substantially parallel with the center axis of the piston seal, wherein the plurality of rods are received by corresponding holes of the orthogonal receptacles of the second locking structures, and wherein the one or more load structures are configured to reduce a pre-load of the piston seal on a rotor, and wherein the one or more moment structures are configured to preserve an internal moment continuity across a circumference of the piston seal.

2. The segmented piston seal of claim 1, wherein the FSCS and the SSCS are configured to be installed on the rotor of a combined cycle system.

3. The segmented piston seal of claim 1, wherein the plurality of rods are configured to be positioned within a series of the corresponding holes of the orthogonal receptacles of the second locking structures that are configured to receive the plurality of rods.

4. The segmented piston seal of claim 1, wherein the plurality of rods include spheres with expanded diameters extending a distance away from each of the orthogonal arms in a direction substantially parallel with the center axis of the piston seal, the plurality of rods are configured to be received by corresponding holes of the orthogonal receptacles of the second locking structures, the corresponding holes having an expanded diameter to receive the plurality of rods.

5. The segmented piston seal of claim 1, wherein the orthogonal arms of the first locking structures each include a rod having a sphere with an expanded diameter extending a distance away from each of the orthogonal arms in a direction substantially parallel with the center axis of the piston seal, the rods configured to be received by the corresponding holes of the orthogonal receptacles of the second locking structures, the holes having an expanded diameters to receive the rods.

6. The segmented piston seal of claim 1, wherein the first and second locking structures include first and second orthogonal cut-outs, the first and second orthogonal cut-outs are configured to be received by each other.

7. The segmented piston seal of claim 1, wherein an outer circumference of the FSCS and the SSCS include a groove, the groove includes an orthogonal cut-out.

8. A method of forming a segmented piston seal, the method comprising:
forming a first semi-circular section (FSCS);
constructing a first locking structure at opposite ends of the FSCS, the first locking structure formed as a unitary body with the FSCS, each of the first locking structures comprising an orthogonal arm extending a distance away from the FSCS, each orthogonal arm having an inner surface facing toward a center axis of the piston seal and an exterior surface facing away from the center axis of the piston seal, wherein a distal end of each orthogonal arm includes an angle segment extending from the exterior surface a distance away from the center axis of the piston seal;
forming a second semi-circular section (SSCS) that is separate from the FSCS; and
constructing a second locking structure at opposite ends of the SSCS, the second locking structures formed as a unitary body with the SSCS, each of the second locking structures comprising an orthogonal receptacle configured to receive the corresponding orthogonal arm of the FSCS, wherein each of the orthogonal receptacles includes a corresponding angle segment configured to receive the angle segment of the distal end of the corresponding orthogonal arm of the first locking structures, wherein the first locking structure is configured to be coupled with the second locking structure to lock the FSCS and the SSCS together to form a piston seal around a horizontally split turbomachine, wherein the angle segment of one of the second locking structures has an interior surface that is larger than an interior surface of the angle segment of the other second locking structure such that the segmented piston seal includes a gap disposed between the one second locking structure and the corresponding first locking structure, wherein the corresponding first locking structure operably coupled with the one second locking structure is allowed to move in a tangential direction within the angle segment away from a mating surface of the angle segment of the one second locking structure, and the other first locking structure operably coupled with the other second locking structure is prohibited from moving in the tangential direction away from a mating surface of the angle segment of the other second locking structure responsive to the second locking structures receiving the first locking structures, wherein the orthogonal arms of the first locking structures include a plurality of rods extending a distance away from each of the orthogonal arms in a direction substantially parallel with the center axis of the piston seal, the plurality of rods configured to be received by corresponding holes of the orthogonal receptacles of the second locking structures, and wherein the first locking structure coupled with the second locking structure forms one or more load structures and one or more moment structures, wherein the one or more load structures are configured to reduce a pre-load of the piston seal on a rotor, and wherein the one or more moment structures are configured to preserve an internal moment continuity across a circumference of the piston seal.

9. The method of claim 8, further comprising installing the FSCS and the SSCS to install on a rotor of a combined cycle system.

10. The method of claim 8, wherein the plurality of rods include spheres with expanded diameters extending a distance away from each of the orthogonal arms in a direction substantially parallel with the center axis of the piston seal; and
further comprising receiving the plurality of rods having spheres by corresponding holes of the orthogonal receptacles of the second locking structures.

11. The method of claim 8, wherein the orthogonal arms of the first locking structures each include a rod having a sphere with an expanded diameter extending a distance away from each of the orthogonal arms in a direction substantially parallel with the center axis of the piston seal; and
further comprising receiving the rod having the sphere by a corresponding hole of the orthogonal receptables of the second locking structures.

12. The method of claim 8, further comprising constructing the first and second locking structures include first and second orthogonal cut-outs; and forming the first and second orthogonal cut-outs are configured to be receive the first and second orthogonal cut-outs.

13. A segmented piston seal comprising:

a first semi-circular section (FSCS) that includes first locking structures at opposite ends of the FSCS, the first locking structures comprising orthogonal arms extending a distance away from the FSCS, the orthogonal arms comprising a plurality of rods disposed along the orthogonal arms and extending a distance away from each of the orthogonal arms in a direction substantially parallel with a center axis of a piston seal;

a second semi-circular section (SSCS) that is separate from the FSCS, the SSCS including second locking structures comprising orthogonal receptacles comprising a plurality of receptacle holes configured to receive the corresponding rods of the first locking structures within the plurality of receptacle holes to lock the FSCS and the SSCS together to form the piston seal, wherein the FSCS and the SSCS are configured to be installed horizontally on a rotor of a combined cycle system, wherein the orthogonal arms of the first locking structures include a plurality of rods extending a distance away from the orthogonal arms in a direction substantially parallel with the center axis of the piston seal, wherein the plurality of rods of configured to be received by corresponding holes of the orthogonal receptacles of the second locking structures.

14. The segmented piston seal of claim 13, wherein at least one of the plurality of rods includes a sphere with an expanded diameter disposed at an end portion of the at least one rod, and a corresponding receptacle hole of the orthogonal receptacles includes a corresponding spherical receptacle configured to receive the sphere of the at least one rods.

* * * * *